US012602902B2

(12) United States Patent
Fidentzis et al.

(10) Patent No.: US 12,602,902 B2
(45) Date of Patent: Apr. 14, 2026

(54) SURVEILLANCE CONTAINER FOR VEHICLE ROOF

(71) Applicant: ASSURE MSP, Inc., Pleasanton, CA (US)

(72) Inventors: George Fidentzis, Tracy, CA (US); James Graf, San Mateo, CA (US); Scott Snyder, San Diego, CA (US)

(73) Assignee: ASSURE MSP, Inc., Pleasanton, CA (US)

( * ) Notice: Subject to any disclaimer, the term of this patent is extended or adjusted under 35 U.S.C. 154(b) by 183 days.

(21) Appl. No.: 18/355,121

(22) Filed: Jul. 19, 2023

(65) Prior Publication Data

US 2025/0029358 A1     Jan. 23, 2025

(51) Int. Cl.
| | |
|---|---|
| *G06V 10/70* | (2022.01) |
| *G06V 10/94* | (2022.01) |
| *G06V 20/56* | (2022.01) |
| *H04N 7/18* | (2006.01) |
| *H04N 23/51* | (2023.01) |
| *H04N 23/57* | (2023.01) |
| *H04N 23/617* | (2023.01) |

(52) U.S. Cl.
CPC .............. *G06V 10/70* (2022.01); *G06V 10/95* (2022.01); *G06V 20/56* (2022.01); *H04N 7/181* (2013.01); *H04N 23/51* (2023.01); *H04N 23/57* (2023.01); *H04N 23/617* (2023.01)

(58) Field of Classification Search
CPC ........ G06V 10/70; G06V 10/95; G06V 20/52; G06V 20/56; H04N 23/51; H04N 23/617; H04N 23/90; H04N 7/181
See application file for complete search history.

(56) References Cited

U.S. PATENT DOCUMENTS

| | | | | |
|---|---|---|---|---|
| 11,377,130 | B2 * | 7/2022 | Mesher ................ | B61L 99/002 |
| 2017/0057422 | A1 * | 3/2017 | Takehara ............... | B60R 11/04 |
| 2018/0120440 | A1 * | 5/2018 | O'Keeffe ............... | G01S 17/36 |
| 2018/0127006 | A1 * | 5/2018 | Wade ...................... | B61L 23/04 |
| 2019/0271550 | A1 * | 9/2019 | Breed ................ | G01C 21/3811 |
| 2021/0280028 | A1 * | 9/2021 | Levy ..................... | G06V 40/173 |
| 2023/0026675 | A1 * | 1/2023 | Wingarten ........... | F16M 13/022 |
| 2024/0267490 | A1 * | 8/2024 | Scott ..................... | H04N 23/13 |

* cited by examiner

*Primary Examiner* — Amy R Hsu
(74) *Attorney, Agent, or Firm* — Straylight LLP

(57) ABSTRACT

In some examples, a vehicle rooftop surveillance system may include a container. In such examples, the container may include a base comprising a top portion and a bottom portion, a base opening at the bottom portion of the base and an interior surface extending from the base opening to the top portion of the base. Additionally, the container may include a first viewing window adapted so that a first sensor within the container can detect objects outside the container. Further, the container may include a fastener element configured to attach the base to a roof of a vehicle.

19 Claims, 8 Drawing Sheets

SURVEILLANCE CONTAINER FOR VEHICLE ROOF

FIELD OF DISCLOSURE

The disclosed embodiments generally relate to mobile surveillance containers.

BACKGROUND

Many surveillance techniques are known, including those that use cameras to observe a subject. Cameras can be placed in a myriad of locations, both fixed and mobile. In order to work for surveillance, the camera must be close enough to observe the subject, without being detected by the subject. Efforts to develop ideal surveillance devices and techniques continue.

SUMMARY

In some examples, a vehicle rooftop surveillance system may include a container. In such examples, the container may include a lid comprising a top portion and a bottom portion. Additionally, the lid may further include a lid opening at the bottom portion of the lid and an interior surface extending from the lid opening to the top portion of the lid. Additionally, the container may include a first viewing window adapted so that a first sensor within the container can detect objects outside the container. Further, the container may include a base including a fastener element configured to attach the base to a roof of a vehicle.

In other examples, a vehicle rooftop surveillance system may include a container. In such examples, the container may include a base comprising a top portion and a bottom portion. Additionally, the base may further include a base opening at the top portion of the base and an interior surface extending from the base opening to the bottom portion of the base. Additionally, the container may include a first viewing window adapted so that a first sensor within the container can detect objects outside the container. Further, the container may include a fastener element configured to attach the base to a roof of a vehicle.

In various examples, a vehicle rooftop surveillance system may include a container. In such examples, the container may include a lid and a base. Additionally, the container may include a first viewing window and a portion of the viewing window may be positioned on the lid while another portion of the viewing window may be positioned on the base. Further, the first viewing window may be adapted so that a first sensor within the container can detect objects outside the container. Further, the container may include a fastener element configured to attach the base to a roof of a vehicle.

Figure 1:
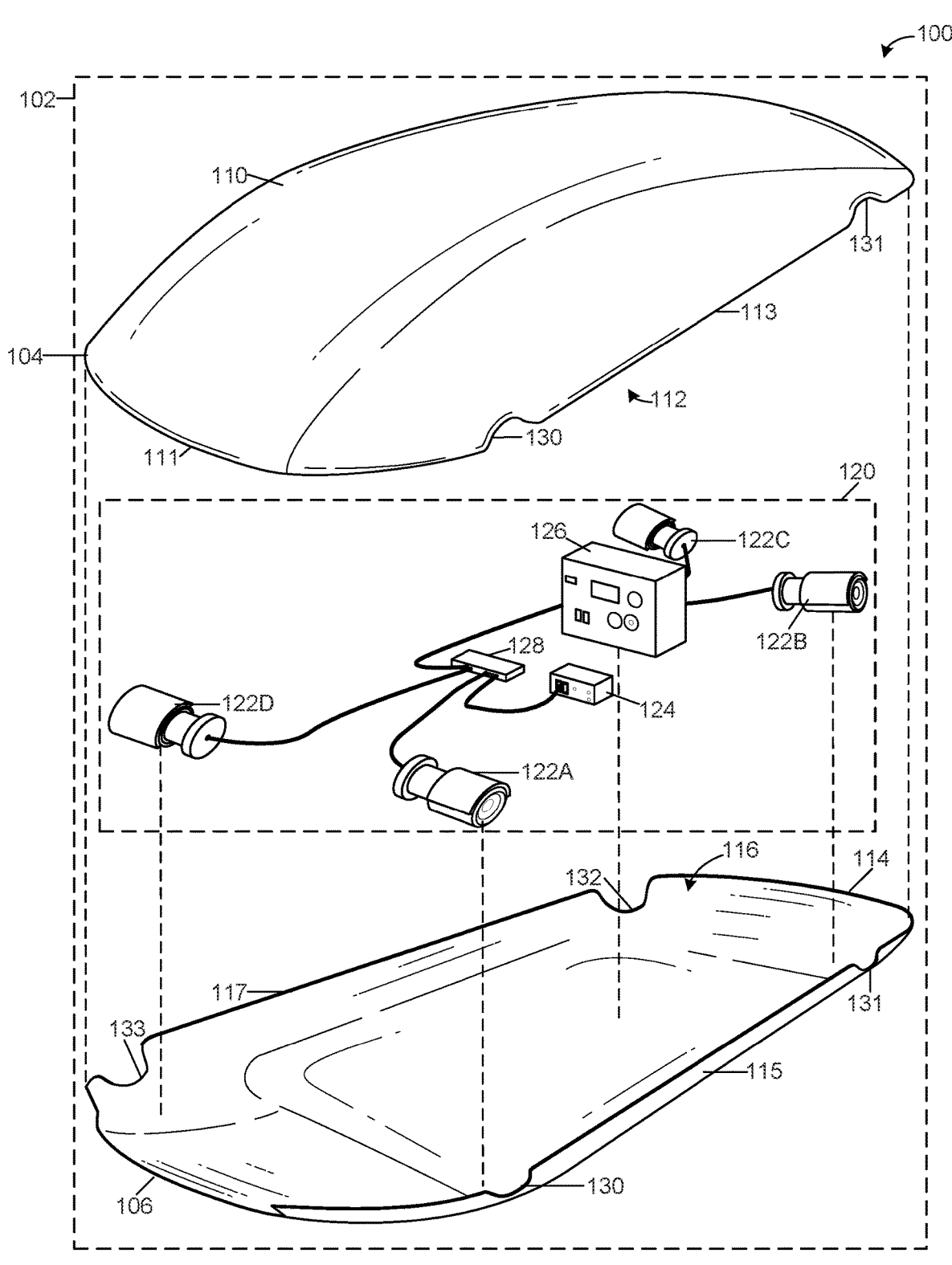
FIG. 1 illustrates an exploded view of an example surveillance container.

Throughout the drawings, identical reference numbers designate similar, but not necessarily identical elements. The figures are not necessarily to scale, and the size of some parts may be exaggerated to more clearly illustrate the example shown. Moreover, the drawings provide examples and/or implementations consistent with the description. However, the description is not limited to the examples and/or implementations provided in the drawings.

DETAILED DESCRIPTION

Examples provide for a surveillance container. In some examples, the surveillance container may include a lid and a base. In other examples the surveillance container may be any type of container, such as containers similar to rooftop mounted signs, placards and figures as seen on food delivery vehicles, taxis and pest extermination service vehicles. Additionally, the surveillance container may include at least one viewing window adapted for use with a sensor, such as a camera. Additionally, the sensor may be aligned to detect, through the viewing window, objects or persons outside the surveillance container or capture data related to objects or persons outside the surveillance container. In some instances, the viewing window may include a one-way-viewing element. As described herein, the one-way-viewing element may appear reflective or opaque on one side (as described herein as the "opaque or reflective side") and transparent on the other side (as described herein as the "transparent side"). The opaque or reflective side of the one-way-viewing element may face the exterior surface of the surveillance container, while the transparent side of the one-way-viewing element may face the interior surface of the surveillance container. That way, the sensor, such as a camera, within the surveillance container and positioned on the transparent side of the one-way-viewing element, may detect or capture data related to one or more objects through the transparent side of the one-way-viewing element without passersby being able to notice or look through the viewing window. In other examples, the opaque or reflective side may be modified or augmented to match the color of the surface exterior of the container. That way, the viewing window may be less obvious to passersby. Alternatively, and in other examples, the one-way viewing element may have properties that make the one-way viewing element itself opaque to visible light and transparent to ultraviolet (UV) or infrared (IR) radiation. In such examples, the sensor, such as an UV or IR sensor, within the surveillance container, may detect or capture data related to the environment outside of the surveillance container through the one-way viewing element.

Additionally, examples provide for the surveillance container to include multiple sensors and a viewing window for each of the multiple sensors. Further, examples provide for the data captured by the sensors in the surveillance container to be transmitted to a computing device operated by a user. In such examples, the computing device may display the data, such as images, audio and/or video included in the data. For instance, in examples where the surveillance container is attached to the roof of a vehicle, such as a sports utility vehicle (SUV), the one or more sensors inside the surveillance container may capture, through a corresponding viewing window of the surveillance container, video or one or more images of an environment outside of the surveillance container. Additionally, the surveillance container may include a communications interface, such as a wireless modem, that may transmit data of the captured video or one or more images to a computing device of a user, such as a law enforcement officer. The computing device may display the video or the one or more images based on the received data. In various instances, the mobile computing device may display the video or the one or more images in real-time.

A. Exemplary Surveillance Container

With reference to FIG. 1, example surveillance system 100 may include a container 102. As illustrated in FIG. 1, container 102 may include lid 104 and base 106. Additionally, container 102 may include an interior storage space or surface between lid 104 and base 106, when container 102 is closed (e.g., when the edge or rim of lid 104 and the edge or rim of base 106 are in contact). For example, with reference to FIG. 1, lid 104 may include top portion 110 and bottom portion 111. Additionally, lid 104 may have a thickness that defines an opening 112 at bottom portion 111 of lid 104 and an interior surface that extends from opening 112 to top portion 110. In some instances, the interior surface may form a concave shape within lid 104. Additionally, and as illustrated in FIG. 1, bottom portion 111 of lid 104 may include an edge or rim 113 at or near the opening at bottom portion 111. Moreover, base 106 may include top portion 114 and bottom portion 115. Further, base 106 may have a thickness that defines an opening at top portion 114 and an interior surface that extends from an opening to bottom portion 115. As illustrated in FIG. 1, top portion 114 may include an edge or rim 117 at or near opening 116. In instances where rim 113 of lid 104 is in contact with rim 117 of base 106 (e.g., when container 102 is closed), storage space is formed between the interior surface of lid 104 and the interior surface of base 106.

In some examples, lid 104 and base 106 may be coupled to one another by a hinge. In such examples, one of the plates of the hinge may be secured, attached or coupled to a portion of lid 104, while another plate of the hinge may be secured, attached or coupled to a portion of base 106. In other examples, lid 104 and base 106 may be coupled or attached to one other by one or more clamps or clamp-like elements. Additionally, or alternatively, in various examples, lid 104 and base 106 may further include a locking device or mechanism that mechanically and/or electronically fastens lid 104 and base 106 to one another. In some instances, container 102, such as lid 104 and base 106, may be both formed from impact resistant material, such as acrylonitrile butadiene styrene (ABS) plastic.

Additionally, container 102 may include one or more hardware components 120, such as one or more sensors (e.g., sensor 122A, sensor 122B, sensor 122C and sensor 122D). The one or more sensors, such as, sensor 122A, sensor 122B, sensor 122C and sensor 122D, may be positioned within the interior surface of lid 104 and/or the interior surface of base 106. Examples of sensors that may be included in container 102 may include an optical/vision sensor, such as a camera, an infrared sensor, an ultraviolet sensor, and a thermal sensor. Although FIG. 1 illustrates four sensors within container 102, any number of sensors may be included within container 102. Sensors may be attached to the interior surface of base 106 or the interior surface of lid 104 and may be attached in either a fixed position relative to a corresponding viewing window, or may be attached with a pivot point to facilitate a different position or angle relative to the viewing window for purposes of changing the field of view outside the container 102 or to otherwise enhance data collection of such sensor.

Moreover, container 102 may include one or more viewing windows, such as viewing window 130, viewing window 131, viewing window 132 and viewing window 133. As described herein, the viewing window may be adapted so that a corresponding sensor, such as sensor 122A, sensor 122B, sensor 122C and sensor 122D, positioned within the container 102 can detect objects or persons outside of container 102. As described herein, the one or more viewing windows may be any shape. Examples of the shapes the one or more viewing windows includes, a rectangular shape, an oval shape or circular shape. Although FIG. 1 illustrates four viewing windows (e.g., viewing window 130, viewing window 131, viewing window 132 and viewing window 133), container 102 may include any number of viewing windows for any number of sensors included in container 102 and may exist in the front, back or either side of the base 106 or the lid 104.

Figure 2A:
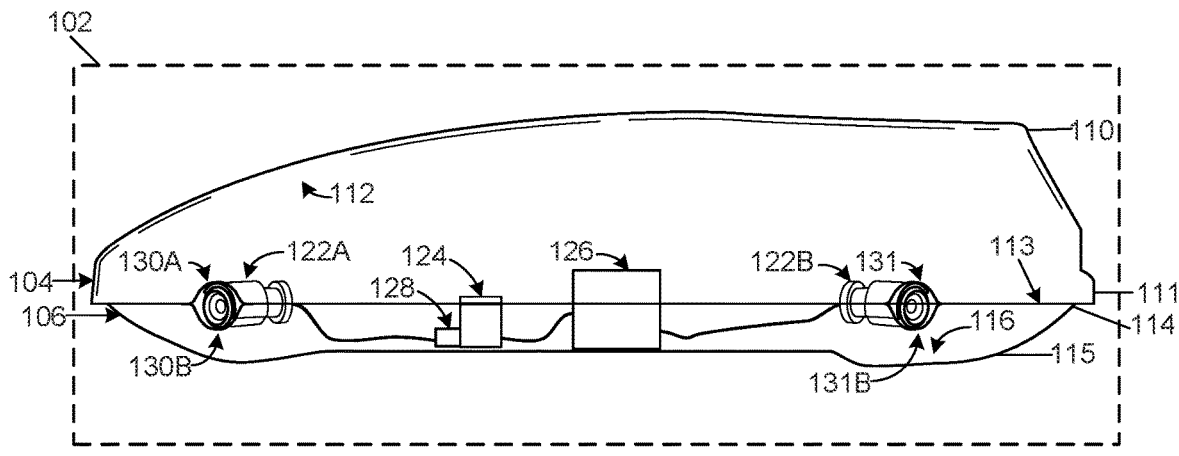
FIG. 2A illustrates a cross sectional right-side view of the example surveillance container of FIG. 1.
Figure 2B:
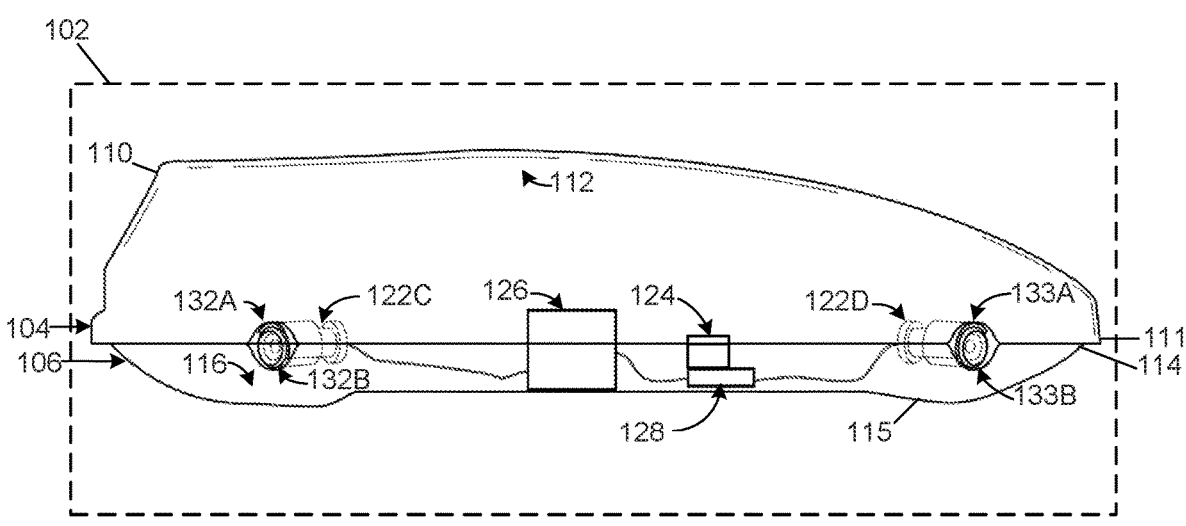
FIG. 2B illustrates a cross sectional left-side view of the example surveillance container of FIG. 1.
Figure 3:
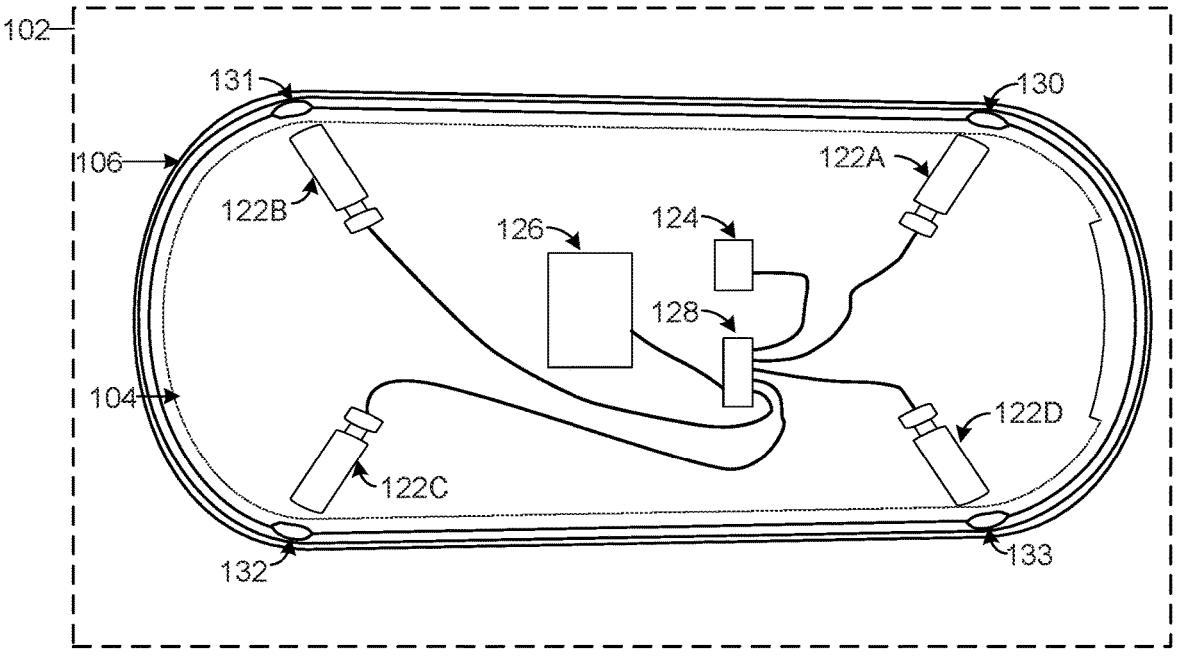
FIG. 3 illustrates a top view of the example surveillance container of FIG. 1 with a transparent top portion.

As illustrated in FIGS. 1, 2A and 2B, a portion of a viewing window may be in lid 104, while another portion of the same viewing window may be in base 106. Additionally, the viewing window may include a first opening on the exterior of lid 104, a second opening on the interior surface of lid 104, and a channel/cavity that extends from the first opening to the second opening. Additionally, for each viewing window, a portion of the first opening, the second opening and the channel may be on lid 104 and another portion of the first opening, the second opening and the channel may be on base 106. Further, a sensor inside of container 102 may be positioned and/or aligned such that, when container 102 is closed (e.g., rim 113 of lid 104 is in contact with rim 117 of base 106), the sensor may detect objects or persons outside of container 102 and through the corresponding surveillance window that is partially on lid 104 and partially on base 106.

By way of example and as illustrated in FIG. 2A, lid 104 may include a portion of viewing window 130—first portion 130A. Additionally, for first portion 130A, lid 104 may have a thickness that defines a first opening on the corresponding exterior surface of lid 104, a second opening on the corresponding interior surface of lid 104, and a first channel extending from the first opening to the second opening. Moreover, base 106 may include a portion of viewing window 130—second portion 130B. Further, for second portion 130B, base 106 may have a thickness that defines a third opening on the corresponding exterior surface of base 106, a fourth opening on the corresponding interior surface of base 106, and a second channel extending from the third opening to the fourth opening. That way, when rim 113 of lid 104 and rim 117 of base 106 are in contact (e.g., container 102 is closed), the first opening, the second opening, the first channel, the third opening, the fourth opening and the second channel form a singular opening that is viewing window 130. That way, sensor 122A may be positioned within container 102 such that, when rim 113 of lid 104 is in contact with rim 117 of base 106, sensor 122A may detect objects or persons outside of container 102 and through viewing window 130 (first portion 130A and/or second portion 130B).

Additionally, and as illustrated in FIG. 2A, lid 104 may include a portion of viewing window 131 or first portion 131A and base 106 may include another portion of viewing window 131 or second portion 131B. Moreover, first portion 131A and second portion 131B may be similarly formed, configured, dimensioned as described with first portion 130A and second portion 130B, respectively. That way, sensor 122B may be positioned within container 102 such that, when rim 113 of lid 104 is in contact with rim 117 of base 106, sensor 122B may detect objects or persons outside of container 102 and through viewing window 131 (first portion 131A and/or second portion 131B). Additionally, as illustrated in FIG. 2B, lid 104 may also include a portion of viewing window 132, such as first portion 132A, and a portion of viewing window 133, such as first portion 133A. Moreover, base 106 may include another portion of viewing window 132, such as second portion 132B, and another portion of viewing window 133, second portion 133B. First portion 132A and second portion 132B as well as first portion 133A and second portion 133B may be similarly formed, configured, dimensioned as described with first portion 130A and second portion 130B, respectively. That way, sensor 122C and sensor 122D may be positioned such that, when rim 113 of lid 104 is in contact with rim 117 of base 106, sensor 122C may detect objects or persons outside of container 102 and through viewing window 132 (first portion 132A and/or second portion 132B). Additionally, sensor 122D may detect objects or persons outside of container 102 and through viewing window 133 (first portion 133A and/or second portion 133B).

Figure 4A:
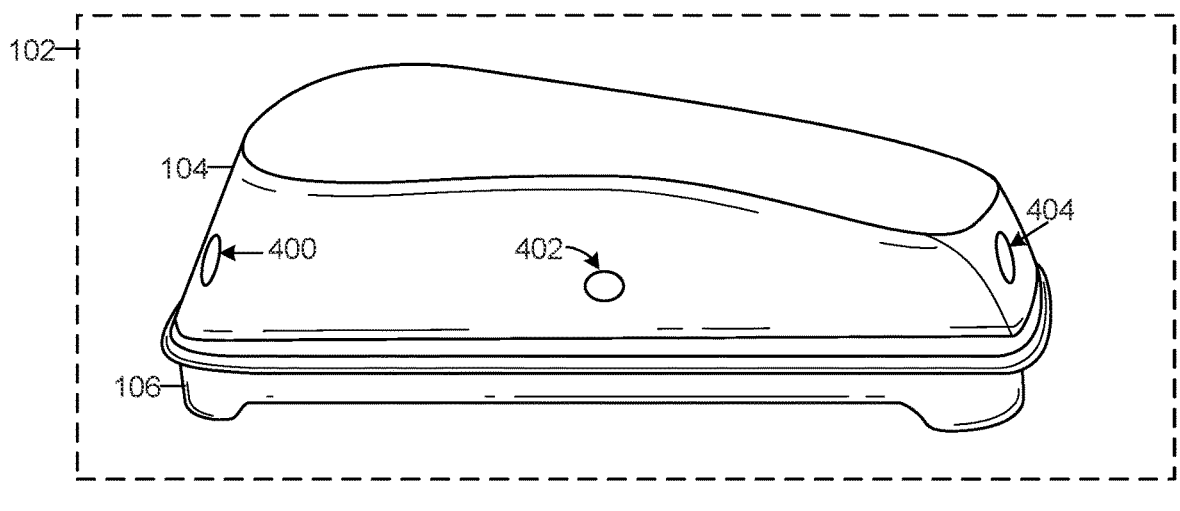
FIG. 4A illustrates an example surveillance container of FIG. 1 showing the positioning of the viewing windows.

In other examples and as illustrated in FIG. 4A, lid 104 may include one or more viewing windows, such as viewing window 400, viewing window 402 and viewing window 404. Each viewing window may include a first opening on the exterior surface of lid 104, a second opening on the interior surface of lid 104 and a channel/cavity that extends from the first opening to the second opening. By way of example, for viewing window 402, lid 104, may have a thickness that defines a first opening on the exterior surface of lid 104 with a channel that extends from the first opening to the second opening of lid 104. Additionally, a sensor may be positioned in or partially in lid 104 in order to detect objects or persons outside of container 102 and through viewing window 402.

Figure 4B:
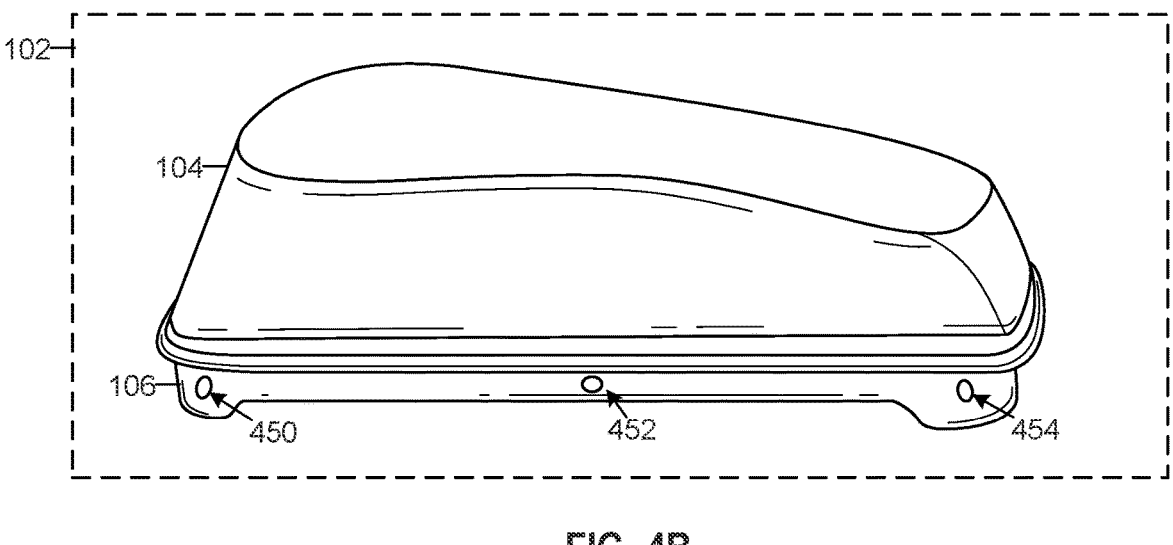
FIG. 4B illustrates an example surveillance container of FIG. 1 showing the positioning of the viewing windows.
Figure 4C:
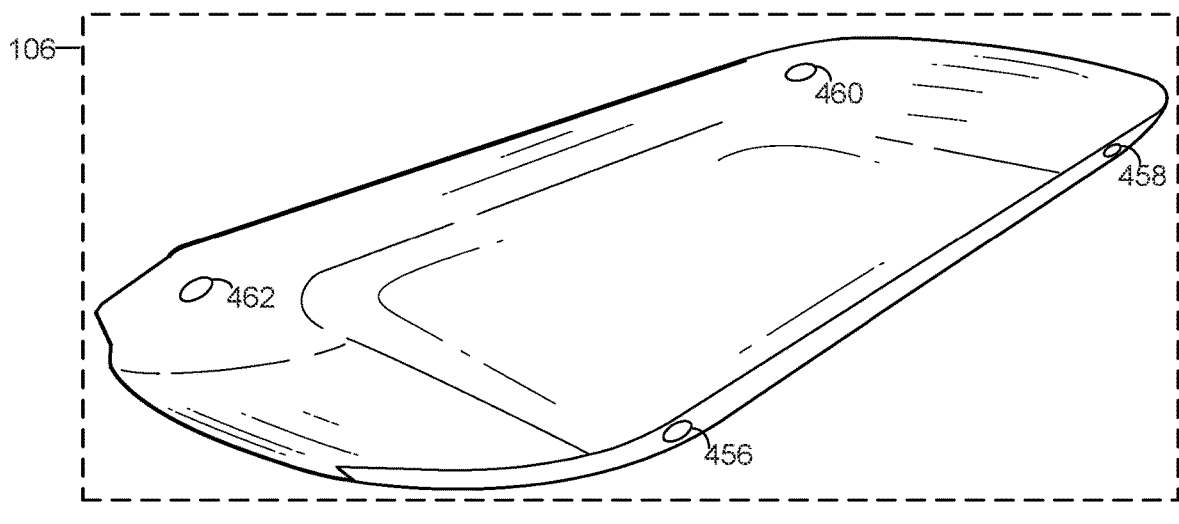
FIG. 4C illustrates another example surveillance container of FIG. 1 showing the positioning of the viewing windows.
Figure 5A:
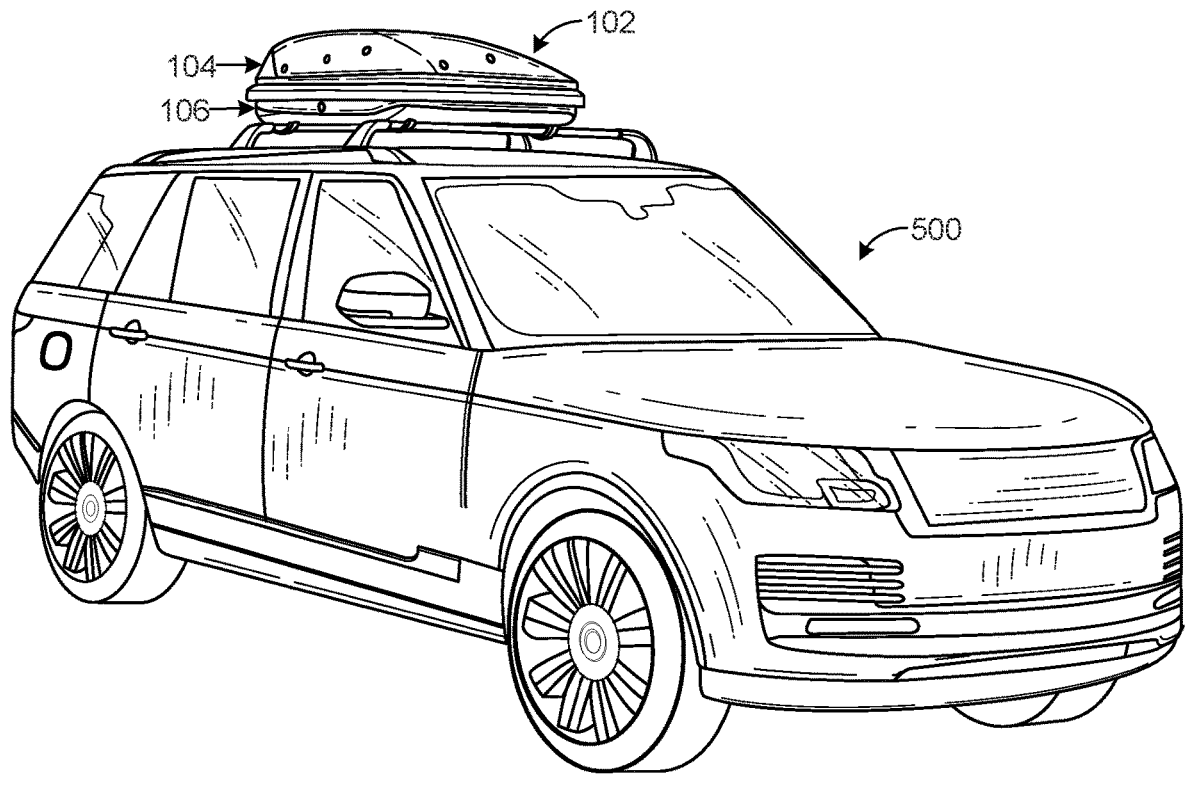
FIG. 5A is a front-left perspective environmental view of the example surveillance container mounted on a sport utility vehicle (SUV)
Figure 5B:
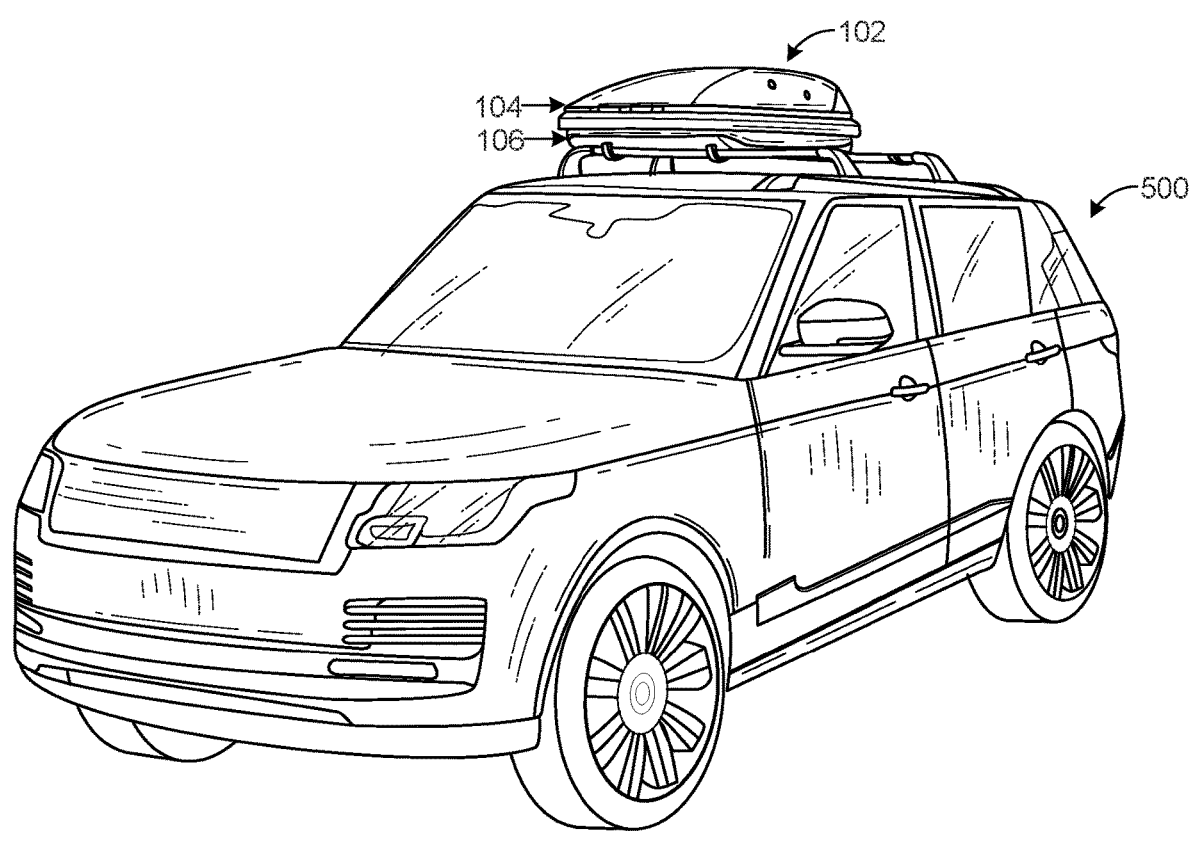
FIG. 5B is a front-right perspective environmental view of the example surveillance container mounted on a sport utility vehicle (SUV)
Figures 5C, 5D:
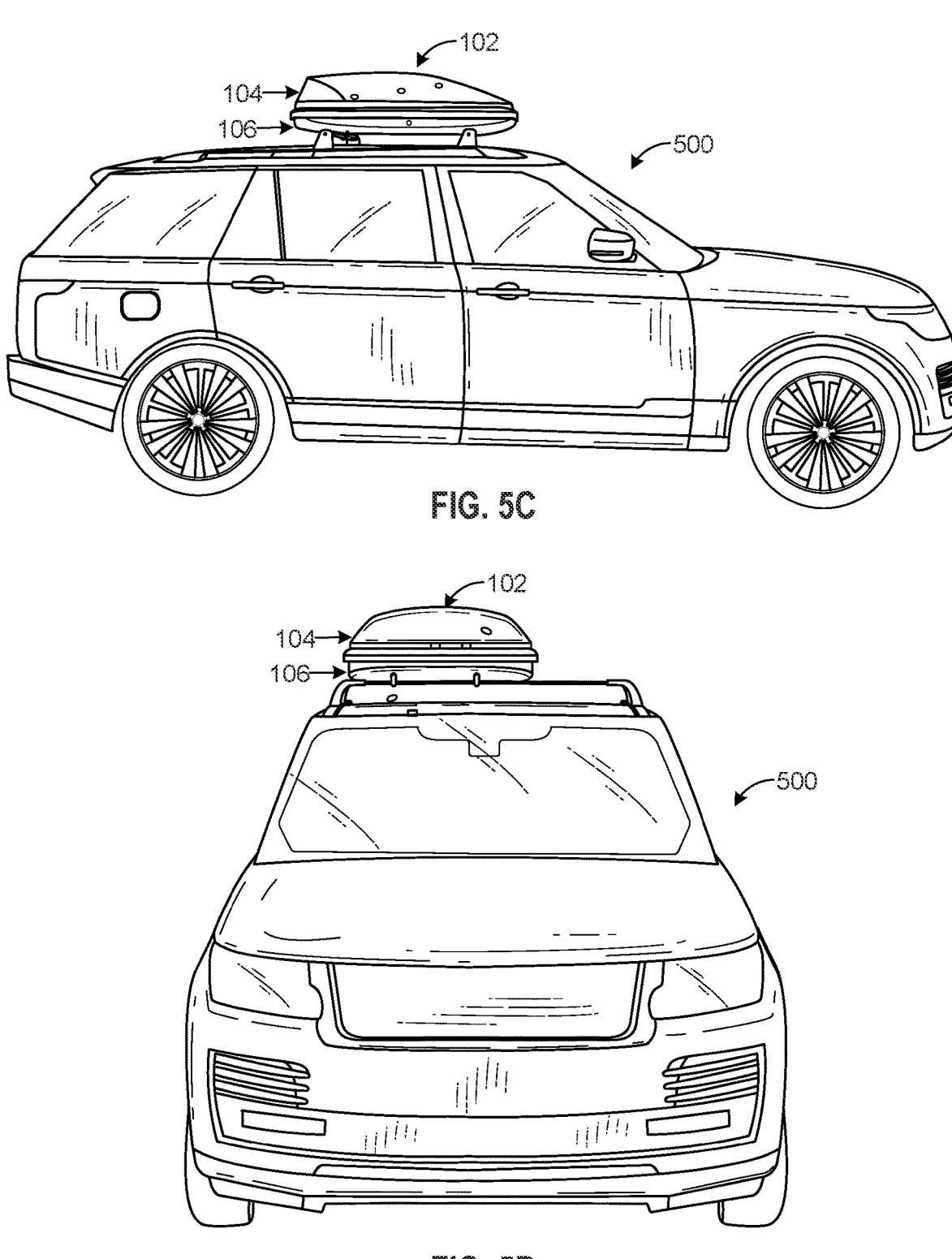
FIG. 5C is a right perspective environmental view of the example surveillance container mounted on a sport utility vehicle (SUV)
FIG. 5D is a front perspective environmental view of the example surveillance container mounted on a sport utility vehicle (SUV)

In various examples and as illustrated in FIG. 4B and FIG. 4C, base 106 may include one or more viewing windows, such as viewing window 450, viewing window 452 viewing window 454, viewing window 456, viewing window 458, viewing window 460 and viewing window 462. Each viewing window may include a first opening on the exterior surface of base 106, a second opening on the interior surface of base 106 and a channel that extends from the first opening to the second opening. By way of example, base 106 may include, viewing window 454. Additionally, for viewing window 454, base 106 may have a thickness that defines a first opening on the exterior surface of base 106 with a channel that extends from the first opening to a second opening of the interior surface of base 106. Additionally, the corresponding sensor may be within or partially within the space between the interior surface of base 106 to detect objects or persons outside of container 102 and viewing window 454.

In some examples, container 102 may be coupled to the roof of a vehicle. Additionally, the one or more sensors, such as sensor 122A, sensor 122B, sensor 122C and sensor 122D may detect objects or persons outside of container 102 and through a corresponding viewing window. Further, the one or more sensors may generate sensor data including one or more images or videos of an environment, including objects and persons, outside of container 102. The one or more images or videos may include the detected objects or persons. FIGS. 5A-5D each illustrate an example vehicle 500 with container 102 coupled to the roof of the vehicle. In some instances, and as illustrated in FIGS. 5A-5D container 102 may be coupled to one or more railings attached to the roof of vehicle 500. In such instances, container 102 may include one or more clips, mounts, clamps, and/or screws.

In some examples, container 102 may include a night or enhanced vision system to capture images at night or in low light. In such examples, the night or enhanced vision system may include one or more hardware components 120, such as one or more sensors (e.g., sensor 122A, sensor 122B, sensor 122C, and/or sensor 122D). The one or more sensors, such as sensor 122A, sensor 122B, sensor 122C and/or sensor 122D, may be an infrared sensor configured to detect infrared light that is reflected off one or more objects or persons outside of container 102 and through a corresponding viewing window. Additionally, the night or enhanced vision system may include an infrared illuminator device, such as one or more infrared light emitting diodes (LED(s)), that projects or provides light in the infrared spectrum outside of container 102. The infrared sensor of the night or enhanced vision system may capture clearer and higher quality images of one or more objects or persons within the area of an environment outside of container 102 that the infrared illuminator device has projected or provided the infrared light to. In some instances, the infrared illuminator device may project or provide the infrared light through the same viewing window an infrared sensor is detecting objects through. By way of example and as illustrated in FIG. 1 and FIG. 2A, container 102 may include a camera that includes sensor 122B. Sensor 122B may be an infrared sensor configured to detect infrared light that is reflected off one or more objects or persons outside of container 102 and through a lens of the camera and viewing window 131. Additionally, the camera may include an infrared illuminator device, such as one or more infrared LEDs positioned/coupled around the lens of the camera.

Referring back to FIG. 1, a viewing window, such as viewing window 130, viewing window 131, viewing window 132 and/or viewing window 133, may include a one-way-viewing element. As described herein, the one-way-viewing element may appear reflective or opaque on one side (as described herein as the "opaque or reflective side") and transparent on the other side (as described herein as the "transparent side"). As such, an individual may not be able to look through the one-way-viewing element from the opaque or reflective side of the one-way-viewing element, while a sensor may detect one or more objects through the transparent side of the one-way-viewing element. Additionally, the one-way-viewing element included with the viewing window may be positioned such that the opaque or reflective side of the one-way-viewing element may be parallel, substantially parallel or face the exterior surface of the container 102. The one-way-viewing element may be designed to have an appearance consistent with the reet of the exterior of the container 102 so that it is not visibly obvious to observers. Moreover, the transparent side of the one-way-viewing element may be parallel, substantially parallel or face the interior surface (e.g., the interior surface of lid 104 and/or the interior surface of base 106). Further, a sensor, such as sensor 122A, sensor 122B, sensor 122C and/or sensor 122D, may be positioned on the transparent side of the one-way-viewing element of the viewing window. That way, the sensor may detect or capture data related to one or more objects outside of container 102 through the transparent side of the one-way-viewing element without passersby being able to notice or look through the opaque or reflective side of the one-way-viewing element.

In some examples, a one-way-viewing element may cover and be coupled or attached to an opening of the corresponding viewing window that is on the exterior surface of the container 102 (e.g., exterior surface of lid 104 or exterior surface of base 106). In examples where the one-way viewing element includes an opaque or reflective side, the transparent side of the one-way-viewing element may face or be attached/coupled to the opening of the corresponding viewing window that is on the exterior surface of the container 102. Additionally, the opaque or reflective side of the one-way-viewing element may face away from the exterior surface of the container 102. Further, a sensor inside container 102 and positioned on the transparent side of the one-way-viewing element may detect or capture data related to one or more objects outside of container 102 through the channel of the corresponding viewing window and through the transparent side of the one-way-viewing element.

By way of example and referring to FIG. 1 and FIG. 2A, lid 104 may include a portion of viewing window 131 or first portion 131A and base 106 may include another portion of viewing window 131 or second portion 131B. As described herein, for first portion 131A, lid 104 may have a thickness that defines a first opening on the corresponding exterior surface of lid 104, a second opening on the corresponding interior surface of lid 104, and a first channel extending from the first opening to the second opening. Additionally, for second portion 131B, base 106 may have a thickness that defines a third opening on the corresponding exterior surface of base 106, a fourth opening on the corresponding interior surface of base 106, and a second channel extending from the third opening to the fourth opening. Moreover, viewing window 131 may include a one-way-viewing element, and the one-way-viewing element may be coupled to the first portion 131A or second portion 131B. Further, the transparent side of the one-way-viewing element may face or be coupled to the exterior surface of container 102 adjacent to the opening of viewing window 131 (e.g., the first opening of first portion 131A and/or the third opening of second portion 131B), while the opaque or reflective side of the one-way-viewing element may face away from the exterior surface of container 102 adjacent to the opening of viewing window 131. That way, when container 102 is closed (e.g., when the edge or rim of lid 104 and the edge or rim of base 106 are in contact), the one-way-viewing element may cover viewing window 131. Additionally, sensor 122B may be positioned inside container 102 and behind the second opening and/or fourth opening of viewing window 131 and detect or capture data related to one or more objects outside of container 102 through the first channel and/or third channel of viewing window 131. Additionally, sensor 122B may detect or capture such data through the transparent side of the one-way-viewing element.

In other examples, a one-way viewing element may be coupled to or attached to an opening of the corresponding viewing window that is on the interior surface of the container 102 (e.g., interior surface of lid 104 or interior surface of base 106). In examples where the one-way viewing element includes an opaque or reflective side, the one-way-viewing element included with the corresponding viewing window may be positioned such that the opaque or reflective side of the one-way-viewing element may face or be attached/coupled to the opening of the corresponding viewing window that is on the interior surface of the container 102. Moreover, the transparent side of the one-way-viewing element may face the interior surface of the container 102 (e.g., interior surface of lid 104 and/or interior surface of base 106). That way, a sensor inside container 102 and positioned in front of the transparent side of the one-way-viewing element may detect or capture data related to one or more objects outside of container 102 through the transparent side of the one-way-viewing element and through the channel of the corresponding viewing window.

By way of example and referring to FIG. 1 and FIG. 2B, lid 104 may include a portion of viewing window 132 or first portion 132A and base 106 may include another portion of viewing window 131 or second portion 132B. As described herein, for first portion 132A, lid 104 may have a thickness that defines a first opening on the corresponding exterior surface of lid 104, a second opening on the corresponding interior surface of lid 104, and a first channel extending from the first opening to the second opening. Additionally, for second portion 132B, base 106 may have a thickness that defines a third opening on the corresponding exterior surface of base 106, a fourth opening on the corresponding interior surface of base 106, and a second channel extending from the third opening to the fourth opening. Moreover, viewing window 132 of base 106 may include a one-way-viewing element, and the one-way-viewing element may be coupled to the second opening or the fourth opening. In some instances, the one-way-viewing element may be split into two portions and the first portion 132A may include one of the two portions, while the second portion 132B may include the second of the two portions. Further, the opaque or reflective side of the one-way-viewing element 140C may face or be coupled to the interior surface of container 102 adjacent to the opening of viewing window 132 (e.g., the second opening of first portion 132A and/or the fourth opening of second portion 132B), while the opaque or reflective side of the one-way-viewing element may be parallel to or substantially parallel to the exterior surface of container 102 adjacent to the opening of viewing window 131. That way, sensor 122C, positioned inside container 102 and facing the transparent side of the one-way-viewing element may detect or capture data related to one or more objects outside of container 102 through the transparent side of one-way-viewing element 140C. Additionally, sensor 122C may detect or capture such data through the channel of viewing window 132.

In various examples, for each of the one or more of the viewing windows, a one-way viewing element may be positioned and attached within a channel extending from the first opening of the corresponding viewing window and the second opening of the corresponding viewing window. In examples where the one-way viewing element includes an opaque or reflective side, the one-way-viewing element included with the corresponding viewing window may be positioned such that the opaque or reflective side of the one-way-viewing element may be parallel to or substantially parallel to the exterior surface of container 102. Moreover, the transparent side of the one-way-viewing element may face the interior surface of the container 102 (e.g., interior surface of lid 104 and/or interior surface of base 106). Further, a sensor inside container 102 may be positioned in front of the transparent side of the one-way-viewing element. That way, the sensor may detect or capture data related to one or more objects outside of container 102 through the channel of the corresponding viewing window, including through the one-way viewing element within the channel, via the transparent side of the one-way-viewing element.

By way of example, a viewing window of lid 104 may include a one-way-viewing element. Additionally, the viewing window may include a first opening on the exterior surface of lid 104, a second opening on the interior surface of lid 104 and a channel extending from the first opening to the second opening. Moreover, the one-way-viewing element may be positioned within and may be coupled to the channel. Additionally, the transparent side of the one-way-viewing element may face the interior surface of lid 104, while the opaque or reflective side of one-way-viewing element may be parallel to or substantially parallel to the exterior surface of lid 104. Further, a sensor may be positioned inside container 102 and facing the transparent side of the one-way-viewing element. That way, the sensor may detect or capture data related to one or more objects outside of container 102 through the channel of the corresponding viewing window, including through the one-way-viewing element through the transparent side of the one-way-viewing element.

In some instances, the color of the opaque or reflective side of the one-way-viewing element may match the color of the exterior surface of container 102. In instances where a viewing window is in lid 104, the color of the opaque or reflective side of the corresponding one-way-viewing element may match the color of the exterior surface of lid 104. Alternatively, in instances where a viewing window is in base 106, the color of the opaque or reflective side of the corresponding one-way-viewing element may match the color of the exterior surface of base 106. However, in instances where a portion of a viewing window is in lid 104 and another portion of the viewing window is on base 106, the color of the opaque or reflective side of the corresponding one-way-viewing element may match the color of the exterior surface of lid 104 and base 106. By way of example and referring to FIG. 2A, the exterior surface of lid 104 may be black, while the exterior surface of base 106 may be purple. Additionally, for viewing window 130, such as first portion 130A and second portion 130B, may include a one-way-viewing element. Moreover, a portion of the one-way-viewing element may be positioned within or on lid 104 (exterior surface or interior surface), while another portion of the one-way-viewing element may be positioned within or on base 106 (exterior surface or interior surface). Further, the color of the reflective or opaque side of the portion of the one-way-viewing element positioned within or on lid 104 may match the color of the exterior surface of lid 104, such as black, while the color of the reflective or opaque side of the portion of the one-way-viewing element positioned within or on base 106 may match the color of the exterior surface of base 106, such as purple.

Referring back to FIG. 1, the one or more hardware components 120 may include communications interface device 124, such as a wireless modem. In some examples, sensor data generated by one or more sensors, such as sensor 122A, sensor 122B, sensor 122C and sensor 122D, may be transmitted to a computing system and/or computing device over one or more communications networks. Examples of the one or more communications network include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet. Additionally, the sensor data generated by the one or more sensors, may include images (or video) of one or more objects or persons outside of container 102. The computing system and/or computing device may receive such sensor data. Additionally, based on the sensor data, the computing system and/or computing device may display or present the images to a user, such as a law enforcement individual, on a display and/or user interface generated by the computing system and/or computing device.

In some examples and not illustrated in FIG. 1, one or more hardware components 120 may include one or more devices or hardware components configured to identify one or more objects or persons from sensor data generated by the one or more sensors of container 102 (e.g., sensor 122A, sensor 122B, sensor 122C and sensor 122D). For example, container 102 may include one or more processors and one or more memory/database devices. Additionally, the one or more memory or database devices and the one or more processors may be electrically coupled to one another. As described herein, the one or more memory or database devices may store and maintain machine learning (ML) datasets of one or more trained machine learning processes that the one or more processors may utilize. The one or more trained machine learning processes may be associated with object recognition and the ML datasets may include one or more model parameters of the corresponding trained machine learning process. Additionally, the one or more processors may obtain, from the memory or database device, the ML datasets and utilize the ML datasets to identify one or more objects or persons in the sensor data generated by the one or more sensors of container 102.

By way of example, the one or more processors may obtain, from the one or more memory or database devices, an ML dataset of a trained machine learning process associated with object recognition. Additionally, the one or more processors may obtain, from sensor 122D, sensor data. The sensor data may include one or more images of an environment outside of container 102 and the one or more images may each include one or more objects or persons. Moreover, the one or more processors may deploy and apply the trained machine learning process to the one or more images of the sensor data in accordance with the one or more model parameters of the trained machine learning process. Based on such applications, the processors may generate data that identifies the one or more objects or persons in the one or more images.

In some examples, the one or more processors may generate a message or notification that includes one or more portions of the data that identifies the one or more objects or persons in the one or more images. Additionally, or alternatively, the one or more processors may include in the message or notification the one or more images. Further, the one or more processors may be electrically coupled to the communications interface and configured to transmit, via the communications interface device 124 and over one or more communications networks, the message or notification to a computing system or computing device. In some instances, the message or notification may be transmitted to the computing system or mobile computing device directly. In other instances, the message or notification may be transmitted to the computing system or computing device, via another computing system, such as a cloud computing system comprising one or more servers and/or one or more databases. In such instances, the message or notification may be stored on the other computing system and later accessed by the computing device or the other computing system may later forward the message to the computing device.

In other examples, a computing device that receives the notification or message, may include a display. Additionally, the computing device may display the one or more images and/or the data identifying the one or more objects or persons in the one or more images. For example, a processor of the computing device may receive a message including one or more images (or a video) of sensor data generated by sensor 122C. Additionally, the processor of the computing device may implement operations that extract the one or more images from the message and present the one or more images on the display. In examples where the message includes data identifying the one or more objects or persons in the one or more images, the processor may implement operations that extract the data identifying the one or more objects or persons in the one or more images from the message. Additionally, the processor may implement operations that generate graphical elements that when overlaid on each of the one or more images may highlight or indicate the identified objects in each of the one or more images. That way, a user, such as a law enforcement individual, operating the computing device, may more easily identify the objects in each of the one or more images presented on the display of computing device.

In some instances, a user operating the computing device may view/monitor the sensor data, such as the one or more images (or video) in the sensor data, in real time. In such instances, the one or more processors may generate and transmit the notification or message to the computing device as the sensor data is being generated. Additionally, or alternatively, in various instances, the user operating the computing device may select a particular sensor to view the one or more images (or video) from. For instance, an application program executed by a processor in the computing device operated by the user may generate a user interface on a display of the computing device. The user interface may include one or more interactive features that enable the user to select which of the one or more sensors included in container 102 to view the one or more images (or video) from, such as sensor 122D. Upon interacting with the one or more interactive features, such as one or more buttons displayed on the user interface, the executed application program may generate a message that indicates which of the one or more sensors the user has selected. Additionally, the executed application program may transmit the message to communications interface device 124 and communications interface device 124 may route the message to a processor communicatively coupled to the one or more sensors and communications interface device 124. The processor may extract, from the message, the data indicating which of the one or more sensors the user has selected (e.g., sensor 122D). Based on the extracted data, the processor may obtain sensor data from the selected one or more sensors, such as sensor 122D. Additionally, the processor may generate a response message that includes one or more portions of the obtained sensor data and transmit the response message, via communications interface device 124 and over one or more communications networks to the computing device. The executed application may extract the one or more portions of the obtained sensor data, and display the one or more images (or video) include in the one or more portions of the obtained sensor data on the user interface.

In other instances, a user operating the computing device may remotely turn on or off one or more of the sensors included in container 102. In such instances, an application program executed by a processor of the computing device operated by the user may generate a user interface on a display of the computing device. The user interface may include one or more interactive features that enable the user to select which of the one or more sensors included in container 102 to turn on or off. Based on interactions with the one or more interactive features, the executed application program may generate on/off data identifying which of the sensors of container 102 the user has selected and which of the selected sensors is to be turned on or off, such as sensor 122B is to be turned off. Additionally, the executed application program may generate a message that includes one or more portions of on/off data and may transmit the message to communications interface device 124. Moreover, communications interface device 124 may route the message to a processor communicatively coupled to the one or more sensors and communications interface device 124. The processor may extract, from the message, the one or more portions of on/off data indicating which of the one or more sensors the user has selected (e.g., sensor 122B) and whether the selected sensors are to be turned on or off (e.g., sensor 122B is to be turned off). Based on the extracted data, the processor may transmit one or more messages to the selected sensors to turn off/on. By way of example, the one or more portions of on/off data may indicate that the user has selected sensor 122B to be turned off. Based on the one or more portions, the processor may generate instructions to sensor 122B to turn off. The processor may transmit the instructions to sensor 122B and sensor 122B may turn off based on the instructions sensors 122B received from the processor.

In various instances, a user may remotely adjust or rotate the field of vision of one or more of sensors of container 102. In such instances, the one or more sensors of container 102 may be coupled to a motorized component and the motorized component may rotate the one or more sensors vertically (on a horizontal axis) and/or horizontally (on a vertical axis). As described herein, the motorized component may include one or more motorized devices that may rotate a corresponding sensor, such as sensor 122D, to a particular rotational angle, horizontally and/or vertically. In some instances, the motorized component may include a first motorized device that rotates the corresponding sensor horizontally and a second motorized device that rotates the corresponding sensor vertically.

Additionally, an application program executed by a processor of the computing device operated by the user may generate a user interface on a display of the computing device. The user interface may include one or more interactive features that enable the user to select which of the one or more sensors included in container 102 to rotate and the angle of rotation (horizontally and/or vertically). Based on interactions with the one or more interactive features, the executed application program may generate rotation data identifying which of the sensors of container 102 the user has selected to rotate and the angle of rotation (horizontally and/or vertically) for each of the selected sensors. Moreover, the executed application program may generate a message that includes one or more portions of rotation data and may transmit the message to communications interface device 124. Communications interface device 124 may route the message to a processor communicatively coupled to the one or more sensors, a corresponding motorized component, and communications interface device 124. The processor may extract, from the message, the one or more portions of rotation data indicating which of the one or more sensors the user has selected (e.g., sensor 122A) and the corresponding rotational angle (e.g., sensor 122A is to be rotated horizontally 30 degrees). Based on the extracted data, the processor may transmit one or more messages to the selected sensors and/or corresponding motorized component to rotate the selected sensor(s).

By way of example, the one or more portions of rotational data may indicate that the user has selected sensor 122A to be rotated 30 degrees horizontally to the left of a predetermined vertical plane and 10 degrees vertically above a predetermined horizontal plane. Additionally, a motorized component coupled to sensor 122A may include a first motorized device that rotates sensor 122A horizontally and a second motorized device that rotates sensor 122A vertically. Based on the one or more portions, the processor may generate instructions to sensor 122A and/or the motorized component associated with sensor 122A and the angle(s) of rotation-30 degrees horizontally to the left of a predetermined vertical plane and 10 degrees vertically above a predetermined horizontal plane. The processor may transmit the instructions to sensor 122A and/or the motorized component. Additionally, based on the instructions, the first motorized device may rotate sensor 122A 30 degrees. Moreover, based on the instructions, the second motorized device may rotate sensor 122A 10 degrees above a predetermined horizontal plane.

In other instances, the one or more sensors (e.g., sensor 122A, sensor 122B, sensor 122C and sensor 122D) may be a network camera. In such instances, the network camera may include the one or more components that are configured to identify one or more objects or persons from sensor data generated by the network camera. For instance, each network camera may include a sensor (e.g., sensor 122A, sensor 122B, sensor 122C and sensor 122D), such as a visual/optical sensor. Additionally, each network camera may include a memory or database device that stores and maintains one or more machine learning (ML) datasets of one or more trained machine learning processes, and one or more processors that, as described herein, may utilize the ML datasets to identify one or more objects or persons from sensor data generated by the sensor of the network camera. Further, the one or more processors may store the sensor data generated by the sensor and the data identifying the one or more objects or persons from the sensor data within the memory or database device. In various instances, the network camera may be a low bandwidth device (e.g., transmitting at a low or small transfer rate, such as 20-50 kbps when no footage is being viewed and/or up to 3 Mbps when viewing historical footage at 3 times the speed). As such, the network camera may only require low bandwidth in order to transmit to the computing system or computing device.

Figure 6:
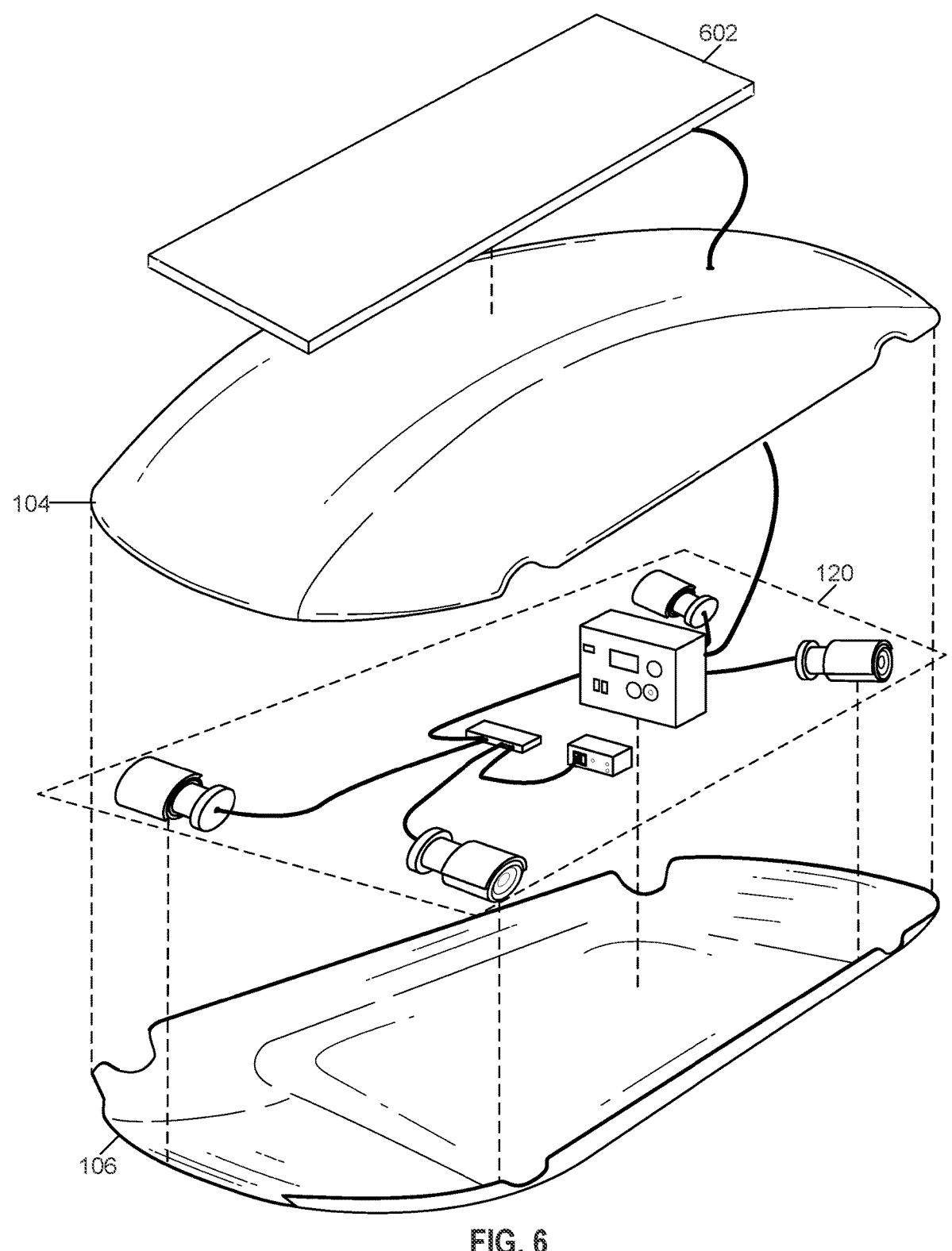
FIG. 6 illustrates an example surveillance container with an example renewable energy system.

Referring back to FIG. 1, container 102 may include a voltage source 126, such as one or more batteries. Additionally, voltage source 126 may store electrical power and supply or provide power to one or more hardware components 120, such as a sensor/camera (e.g., sensor 122A, sensor 122B, sensor 122C and sensor 122D), and the communications interface device 124, within container 102. For instance, voltage source 126 may provide power to one or more hardware components 120 via one or more voltage rails. Examples of the one or more batteries that may be included in container 102 includes, alkaline batteries, nickel metal hydride batteries, and lithium ion batteries. In some examples, the one or more batteries may be rechargeable. In some examples, the one or more other electrical components may be connected to one another with a network switch device 128, such as a Power over Ethernet (POE) switch. In such examples the one or more sensors (e.g., sensor 122A, sensor 122B, sensor 122C and sensor 122D), the communications interface device 124, the voltage source 126, and in some instances the described memory or database device and one or more processors, may be electrically coupled to network switch device 128. Network switch device 128 may provide a local network to the one or more sensors, communications interface device 124, and in some instances the memory and database device and the one or more processors. Additionally, network switch device 128, may provide or supply electrical power to the one or more sensors, and in some instances, the memory and database device and the one or more processors In some examples, container 102 may include a renewable energy system. As illustrated in FIG. 6, example renewable energy system 600 may include one or more solar power panels 602, and in some instances a power inverter if the devices that are being powered requires alternating current (AC). Additionally, one or more solar power panels 602 may be coupled to the top of container 102 and electrically coupled, through one or more additional openings on the container 102, to the voltage source 126 of container 102, such as one or more batteries. That way, as one or more solar power panels 602 generate electricity, the generated electricity may be stored in the one or more voltage sources 126. In such examples, components within container 102 that require electricity to be powered may be powered partially or completely by the electricity generated from one or more solar power panels 602.

In various examples, not illustrated in FIG. 1, container 102 may include one or more heat removal devices. Examples of heat removal devices include heat shielding components and fans. In some instances, container 102 may include one or more fans. Additionally, container 102 may include one or more fan openings. That way, the one or more fans may force air from within container 102, such as hot air generated by one or more hardware components 120, to outside of container 102. In such instances, the one or more fans may be positioned within container 102 near the one or more hardware components 120. Additionally, the one or more fan openings may be positioned on the bottom of base 106. That way, the fan opening may not be as easily noticeable to a passerby. In other instances, container 102 may include foam rubber insulation. In such instances, the foam rubber insulation may be applied to the interior surface of lid 104 and/or the interior surface of base 106. In various instances, container 102 may include one or more heat sink components, such as an aluminum heatsink and fin assemblies. In such instances, the one or more heat sink components may be installed to one or more hardware components 120.

C. Exemplary Hardware and Software Implementations

Embodiments of the subject matter and the functional operations described in this disclosure can be implemented in digital electronic circuitry, in tangibly-embodied computer software or firmware, in computer hardware, including the structures disclosed in this specification and their structural equivalents, or in combinations of one or more of them. Embodiments of the subject matter described in this disclosure can be implemented as one or more computer programs, i.e., one or more modules of computer program instructions encoded on a tangible non-transitory program carrier for execution by, or to control the operation of, a data processing apparatus (or a computing system). Additionally, or alternatively, the program instructions can be encoded on an artificially-generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including by way of example a programmable processor, a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, an application program, an engine, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) or an assisted Global Positioning System (AGPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user embodiments of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a client computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the disclosure or of what may be claimed, but rather as descriptions of features specific to particular embodiments of the disclosure. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, unless otherwise specifically defined herein, all terms are to be given their broadest possible interpretation including meanings implied from the specification as well as meanings understood by those skilled in the art and/or as defined in dictionaries, treatises, etc. It is also noted that, as used in the specification and the appended claims, the singular forms "a," "an," and "the" include plural referents unless otherwise specified, and that the terms "comprises" and/or "comprising," when used in this specification, specify the presence or addition of one or more other features, aspects, steps, operations, elements, components, and/or groups thereof. Moreover, the terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship. In this disclosure, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only and are not to be construed as limiting the described subject matter.

The foregoing is provided for purposes of illustrating, explaining, and describing embodiments of this disclosure. Modifications and adaptations to the embodiments will be apparent to those skilled in the art and may be made without departing from the scope or spirit of the disclosure.

What is claimed is:

1. A vehicle rooftop surveillance system comprising:
a container including:
a base comprising a top portion and a bottom portion, a base opening at the top portion of the base, and an interior surface extending from the base opening to the bottom portion of the base;
a viewing window adapted so that a first sensor within the container can detect objects outside the container, the viewing window comprising a first opening on an exterior surface of the base, a second opening on the interior surface of the base, and a viewing channel extending from the first opening to the second opening; and
a fastener element configured to attach the base to a roof of a vehicle.

2. The vehicle rooftop surveillance system of claim 1, wherein the viewing window includes a one-way-viewing element.

3. The vehicle rooftop surveillance system of claim 2, wherein the one-way-viewing element is at least one of a film or form from glass or plastic.

4. The vehicle rooftop surveillance system of claim 2, wherein the one-way-viewing element is coupled to the second opening.

5. The vehicle rooftop surveillance system of claim 2, wherein the one-way-viewing element is coupled to the first opening.

6. The vehicle rooftop surveillance system of claim 2, wherein the one-way-viewing element is positioned between the first opening and the second opening.

7. The vehicle rooftop surveillance system of claim 1, further comprising:
the first sensor configured to generate sensor data including one or more images of an environment within a field of view of the first sensor.

8. The vehicle rooftop surveillance system of claim 7, wherein:
the viewing window includes a one-way-viewing element; and
the first sensor is positioned within the container such that light is received through the viewing window and the one-way-viewing element and to the first sensor.

9. The vehicle rooftop surveillance system of claim 7, further comprising:
a memory storing instructions; and
at least one processor coupled to the memory, the at least one processor configured to execute the instructions to:
receive the sensor data from the first sensor; and
apply a trained machine learning process to the sensor data to identify one or more objects or persons in the one or more images of the sensor data.

10. The vehicle rooftop surveillance system of claim 9, further comprising:
a communications interface; and
wherein the at least one processor is further coupled to the communications interface and the at least one processor is further configured to execute the instructions to:
based on the application of the trained machine learning process to the sensor data, generate a first dataset including the one or more images of the sensor data and data identifying the one or more objects or persons in the one or more images of the sensor data, and
transmit, via the communications interface and to a first computing system, the first dataset.

11. The vehicle rooftop surveillance system of claim 7, further comprising:
a memory storing instructions;
a communications interface; and
at least one processor coupled to the memory and the communications interface, the at least one processor configured to execute the instructions to:
receive the sensor data from the first sensor;
process the sensor data; and transmit, via the communications interface and to a first computing system, the processed sensor data, the processed sensor data causing the first computing system to display at least a first image of the one or more images.

12. The vehicle rooftop surveillance system of claim 7, wherein the first sensor is a low bandwidth camera.

13. The vehicle rooftop surveillance system of claim 7, further comprising a battery, the battery configured to power at least the first sensor.

14. The vehicle rooftop surveillance system of claim 7, further comprising multiple cameras, the multiple cameras including the first sensor.

15. The vehicle rooftop surveillance system of claim 1, wherein the base comprises the viewing window.

16. The vehicle rooftop surveillance system of claim 1, wherein the container includes a plurality of sensors including the first sensor, each of the plurality of sensors configured to generate sensor data including one or more images of an environment within a field of view of the corresponding sensor.

17. The vehicle rooftop surveillance system of claim 1, further comprising:

a renewable energy system.

18. The vehicle rooftop surveillance system of claim 17, wherein the container further comprises a lid, and wherein the renewable energy system includes one or more solar panels coupled to the lid.

19. The vehicle rooftop surveillance system of claim 1, wherein the container further comprises a lid.

* * * * *